(12) United States Patent
Barber et al.

(10) Patent No.: US 8,099,201 B1
(45) Date of Patent: Jan. 17, 2012

(54) VERTICAL PROFILE DISPLAY WITH ENHANCED TEMPORAL DEPICTION OF NAVIGATION INFORMATION

(75) Inventors: Sarah Barber, Cedar Rapids, IA (US); Kirschen A. Seah, Cedar Rapids, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 699 days.

(21) Appl. No.: 12/231,251

(22) Filed: Aug. 29, 2008

(51) Int. Cl.
*G05D 1/08* (2006.01)
*G01C 23/00* (2006.01)

(52) U.S. Cl. ............ 701/4; 701/3; 701/5; 340/945

(58) Field of Classification Search .......... 701/1–3, 701/5, 7, 209; 340/945, 971, 973
See application file for complete search history.

(56) References Cited

U.S. PATENT DOCUMENTS

| | | | | |
|---|---|---|---|---|
| 5,340,061 A * | 8/1994 | Vaquier et al. | ............ | 244/175 |
| 5,408,413 A * | 4/1995 | Gonser et al. | ............ | 701/204 |
| 6,085,129 A * | 7/2000 | Schardt et al. | ............ | 701/14 |
| 6,112,141 A * | 8/2000 | Briffe et al. | ............ | 701/14 |
| 6,832,138 B1 * | 12/2004 | Straub et al. | ............ | 701/3 |
| 6,870,490 B2 * | 3/2005 | Sherry et al. | ............ | 340/970 |
| 6,985,091 B2 * | 1/2006 | Price | ............ | 340/975 |
| 6,995,690 B1 * | 2/2006 | Chen et al. | ............ | 340/974 |
| 7,209,070 B2 * | 4/2007 | Gilliland et al. | ............ | 342/26 B |
| 7,215,256 B2 * | 5/2007 | Reusser et al. | ............ | 340/975 |
| 7,216,069 B2 * | 5/2007 | Hett | ............ | 703/6 |
| 7,352,292 B2 * | 4/2008 | Alter et al. | ............ | 340/945 |
| 7,675,461 B1 * | 3/2010 | McCusker et al. | ............ | 342/179 |
| 7,765,061 B1 * | 7/2010 | Barber et al. | ............ | 701/206 |
| 7,783,393 B2 * | 8/2010 | Tucker et al. | ............ | 701/4 |
| 7,834,779 B2 * | 11/2010 | He et al. | ............ | 340/973 |
| 2005/0010359 A1 * | 1/2005 | Qureshi | ............ | 701/205 |
| 2005/0273249 A1 * | 12/2005 | Artini et al. | ............ | 701/120 |
| 2008/0172149 A1 * | 7/2008 | Rouquette et al. | ............ | 701/16 |

* cited by examiner

*Primary Examiner* — Mary Cheung
*Assistant Examiner* — Majdi Alsomiri
(74) *Attorney, Agent, or Firm* — Donna P. Suchy; Daniel M. Barbieri

(57) ABSTRACT

The present example a vertical profile display system with enhanced temporal depiction of navigation information. Such a display, or user interface, may advantageously display information relating to the terrain an aircraft is traveling through based on time ahead of the aircraft to a terrain feature or event, rather than distance to the feature or event. Time to a particular feature may typically be displayed with altitude of the aircraft displayed on the Y-axis. However in alternative examples other types of displays, such as three dimensional displays and the like may be substituted for a two dimensional Cartesian display.

20 Claims, 23 Drawing Sheets

VERTICAL PROFILE DISPLAY WITH ENHANCED TEMPORAL DEPICTION OF NAVIGATION INFORMATION

TECHNICAL FIELD

This description relates generally to aircraft avionics and more specifically to the display of information in an aircraft.

BACKGROUND

Flight management has progressed from a compass and an altimeter in early aircraft, to typically complex integrated systems in jetliners and military aircraft. Flight management typically seeks to provide workload-reducing automation on the flight deck typically in combination with multi-sensor navigation capability. Avionics may seek to cover aircraft operation from takeoff to landing. Automating aircraft operation typically tends to reduce chances for operator error, fatigue, frees up flight crew time, and can allow for more precise operation of the aircraft.

A typical flight management system can be a computerized avionics component found on commercial and business aircraft to assist pilots in navigation, flight planning, and aircraft control functions. a conventional flight management system can be composed of various aircraft control functions, and navigation systems.

Navigation information may show the route programmed by the pilots, as well as other pertinent information from the database, such as standard departure and arrival procedures. Navigation information combined with the location of the aircraft may be used to create a moving map display showing the aircraft position and distances.

However, distance may not be of particular interest in various situations, and an avionics system capable of displaying aircraft information relative to parameters rather than distance may be useful.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example is a vertical profile display system with enhanced temporal depiction of navigation information. Such a display, or user interface, may advantageously display information relating to the path an aircraft is traveling along based on time ahead of the aircraft to a feature or event, rather than distance to the feature or event. Time to a particular feature may typically be displayed with altitude of the aircraft displayed on the Y-axis. However in alternative examples other types of displays, such as three dimensional displays and the like may be substituted for a two dimensional Cartesian display.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe a method of providing a vertical profile display (either for a heads up or look-down display system) of time-based navigation information. Although the present examples are described and illustrated herein as being implemented in an aircraft system, the system described is provided as an example and not a limitation. As those skilled in the art will appreciate, the present examples are suitable for application in a variety of different types of display systems, including a mix of heads up displays and look-down display systems, commercial aircraft, private planes, military aircraft, and other aerospace vehicles.

A "Flight Display with Enhanced Temporal Depiction of Navigation Information" is further described in U.S. Pat. No. 7,765,061 issued on Jul. 27, 2010, the contents of which are incorporated herein by reference. Such a flight display having enhanced temporal depiction of navigation information, may describe generation of a time based map for the depiction of enhanced temporal navigation information in a 2-D (look-down) display system. The generation of time based navigation information for a look-down display may also be applied to a vertical profile display system.

With the vertical profile display becoming ever-more ubiquitous in the flight deck, a look down map typically does not provide for the vertical profile display of time-based navigation information such as is described in the examples below. The time based navigation information described below is not available in a vertical profile counterpart on the flight deck of aircraft. The vertical profile display of time based information in the following examples may be considered a unique display of navigation information. The time-based vertical profile may be introduced to accompany the standard "spatial" navigation map and may provide significant benefits for the comprehension of time-based constraints, limits and events along the flight plan.

Figure 1:
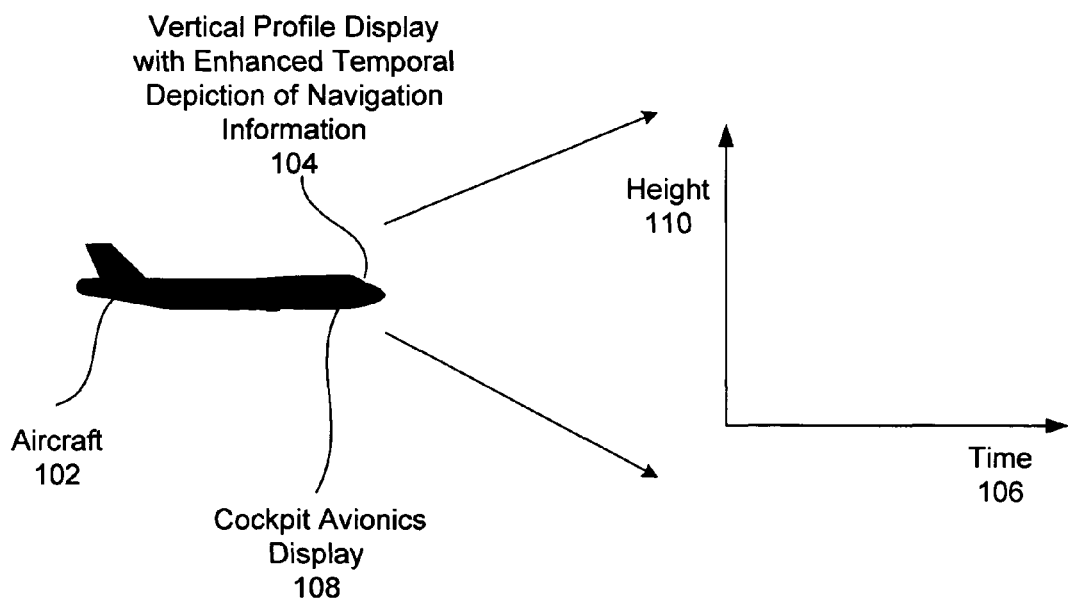
FIG. 1 is a diagram showing an aircraft avionics environment including a vertical profile display of time-based navigation information.

FIG. 1 is a diagram showing an aircraft avionics environment including a vertical profile display of time-based navigation information. As shown an aircraft 102 or other equivalent aerospace vehicle may be equipped with a vertical profile display system with enhanced temporal depiction of navigation information 104. Such a display, or user interface, 104 may advantageously display information relating to the path an aircraft is traveling along based on time ahead of the aircraft 106 to a feature or event, rather than distance to the feature or event. Time to a particular feature may typically be displayed with altitude of the aircraft 102 displayed on the Y-axis 110. However in alternative examples other types of displays, such as three dimensional displays and the like may be substituted for a two dimensional Cartesian display.

The vertical profile display system with enhanced temporal depiction of navigation information 104 may be integrated with a cockpit avionics display system 108. Such a system may provide the hardware to generate the exemplary displays by utilizing typical processing and display equipment to process or otherwise generate the exemplary displays or user interfaces. A number of exemplary vertical profile display systems with enhanced temporal depiction of navigation information 104 may be generated to convey temporal information to an air crew.

In addition vertical profile display system with enhanced temporal depiction of navigation information 104 may work in cooperation with other navigation, display systems and the like to generate a vertical profile display with enhanced temporal depiction of navigation information in cooperation with other displays of information that may be found in an aircraft 102

Figure 2:
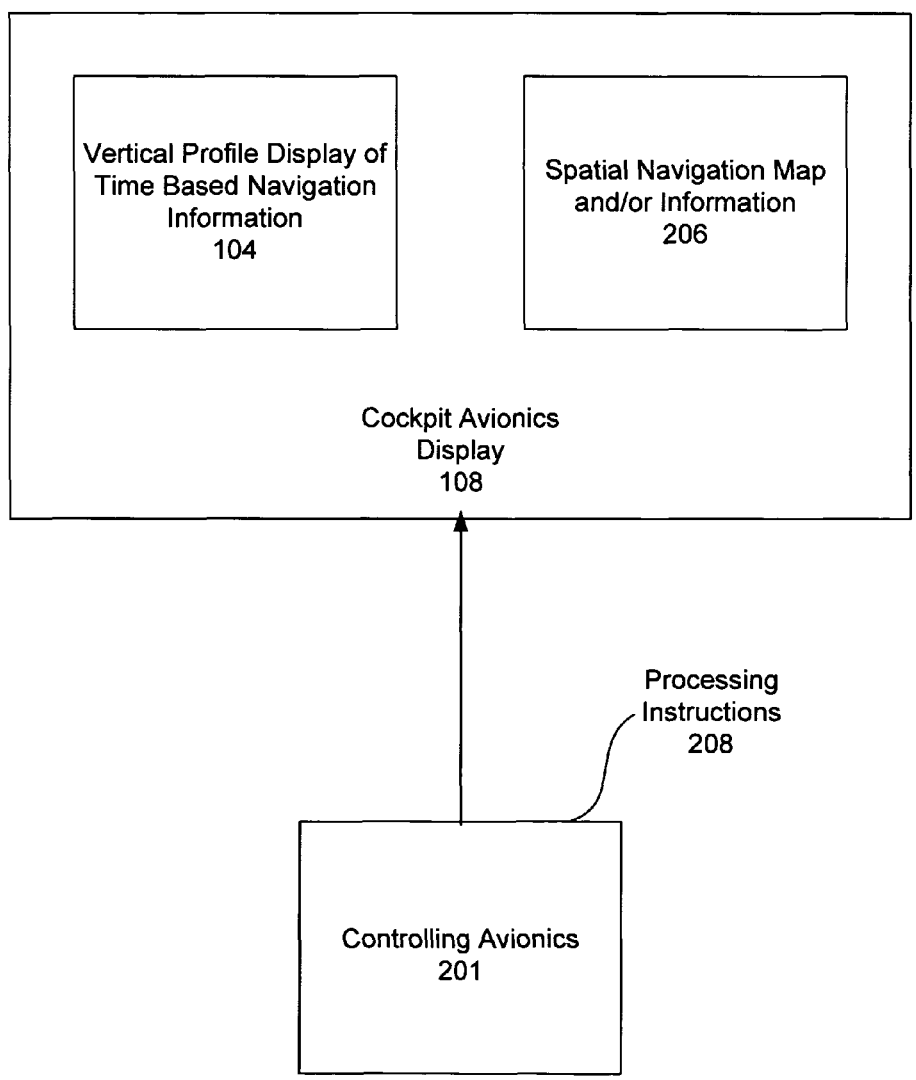
FIG. 2 is a block diagram showing an avionics display system 204 for generating avionics displays, including a vertical profile display of time-based navigation information.

FIG. 2 is a block diagram showing an avionics display system for generating avionics displays, including a vertical profile display of time-based navigation information 204. The examples of a vertical profile display of time-based navigation information 104 described below may be generated by typical avionics equipment, or controlling avionics, 201, 108 implementing processing instructions 208 to generate the various displays 104, on the cockpit avionics display 108.

The avionics display 108 may be a conventionally constructed display device such as a CRT, LCD, plasma display or the like. In addition the display may be configured as a conventional display, a heads up type display, or the like.

In further alternative examples the display 108 may include data input capabilities, such as a touch sensitive display, or other suitable data entry interfaces. Exemplary data input capabilities may include soft keys, buttons surrounding the display with labels generated on the display to indicate button function, dedicated buttons, keyboard entry and the like.

In further alternative examples of displays 108 multiple displays may also be provided to convey one or more vertical profile displays 104. In addition the display or displays, 108 may also display spatial navigation maps, and or information 206 to additionally aid the aircrew.

The controlling avionics 201 may be conventionally constructed to include processing of a suitable method 208 to generate one or more of the cockpit avionics displays 108. The controlling avionics 201 may be conventionally coupled to the cockpit avionics display 108. The controlling avionics may include various inputs, such as from altimeters, velocity information, GPS information and the like.

Processing instructions 208 may be conventionally constructed to work with processing circuitry in the controlling avionics 201. Any suitable machine code such as a high level programming language, machine language or the like may be used to process inputs and generate the exemplary displays 104, 206.

Figure 3:
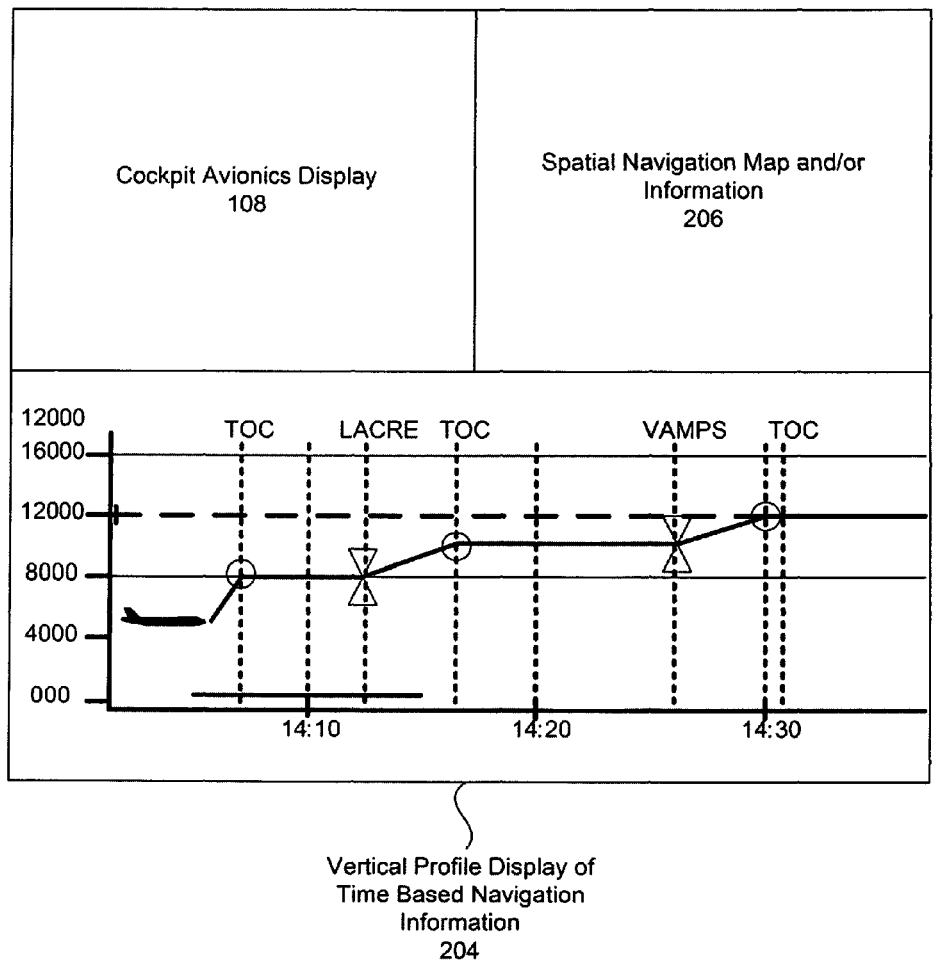
FIG. 3 illustrates a cockpit avionics display 108 such as the exemplary large primary flight display ("PFD") with a two-dimensional (look down) navigation map 206 and vertical terrain profile.

FIG. 3 illustrates a cockpit avionics display 108 such as the exemplary large primary flight display ("PFD") with a two-dimensional (look down) navigation map 206 and vertical terrain profile 204. The PFD may include a plurality of displays including any of those typically found in an aircraft. The display need not be arranged as shown. In alternative examples the individual displays may be arranged in any convenient format, with various displays capable of being added or removed from the plurality of displays as desired. Such a plurality of displays may include one or more vertical situation displays 204.

The lower right window on the above PFD shows a vertical situation display ("VSD") which may include the exemplary vertical profile display of time based navigation information (or alternatively "time profile") 204. This particular display can provide increased awareness of the airplane's vertical situation. Not only can it depict the vertical extent of the flight plan route, along with altitude constraints and waypoint identification, but it can also portray the terrain out ahead of the airplane, along the flight plan route. In particular in the implementations described below the navigational events to occur ahead of the aircraft may be defined in terms of time, rather than in terms of distance ahead of the aircraft. Alternatively, if the airplane is off of the planned route, the VSD can display a simple "along-track" depiction of the terrain. It is a spatial map and may be used in conjunction with the navigation map illustrated in the upper right window.

Vertical profile displays with enhanced temporal depiction of navigation information 204 for display may be generated in a variety of forms as described in the following display examples.

Figure 4:
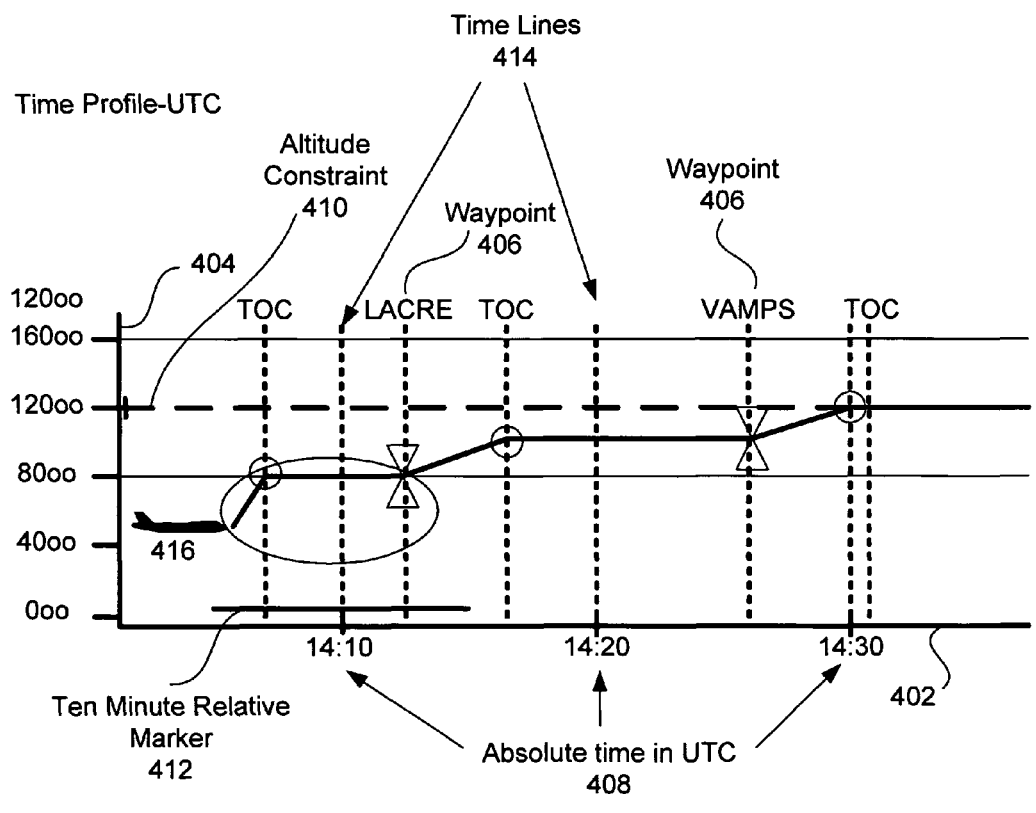
FIG. 4 illustrates an absolute time profile which is a first example of vertical profile display of time based navigation information.

FIG. 4 illustrates an absolute time profile 400 which is a first example of vertical profile display of time based navigation information (104 of FIG. 1). The vertical axis 404 shows aircraft elevation in suitable units. This display 400 is a "time profile" and is based on the previously described VSD layout. However, instead of the range ("X" or horizontal) axis, a horizontal time axis 402 is displayed. This first example of a vertical time profile has an "absolute" time value in UTC marked on the "x" axis 408. Alternatively other absolute time units may be substituted for UTC.

The estimated time of arrival ("ETA") can be calculated for each desired plurality of waypoints 406 based on current and predicted airplane performance and environmental conditions, as may be done in the flight management system ("FMS") today. Points along the X-axis may then be marked in time 408 with the waypoints being positioned at the appropriate ETA. The vertical flight plan route may also be displayed along with any altitude constraints 410. A notable benefit of this time-based depiction is that the vertical performance required to reach the next waypoint is now immediately obvious to the pilot. For example, if an aircraft is going to cross the destination LACRE at 8000 feet at 14:12, and is then scheduled to climb to 10,000 feet by 14:26 at the destination VAMPS, it needs to climb 2000 feet in 14 minutes or 143 feet per minute at its present airspeed.

As time passes, the "time-lines" 414 will typically move towards the left, along with the waypoints 406. As a particular time-line touches the airplane 416, it will disappear and be replaced by a new time-line at the far right of the Vertical profile display of time based navigation information. The horizontal line 412 which stretches from the airplane nose to the right, along the X-axis 402, is a 10 minute "relative" marker. In the example shown the time length of the relative marker may be set to the length of time set between the time lines 408 (here 10 minutes). Alternatively time intervals other than 10 minutes may be utilized. Alternatively the horizontal line 412 may be positioned at other equivalent locations. When a waypoint 406 reaches the end of the horizontal line, it will be 10 minutes away. The scale of the X-axis can be modifiable by the pilot in much the same way as spatial range is changed. In the case of the absolute time scale, the pilot would be able to change the time increment between time lines, such as 5, 10, 20, 60 minutes etc.

Figure 5:
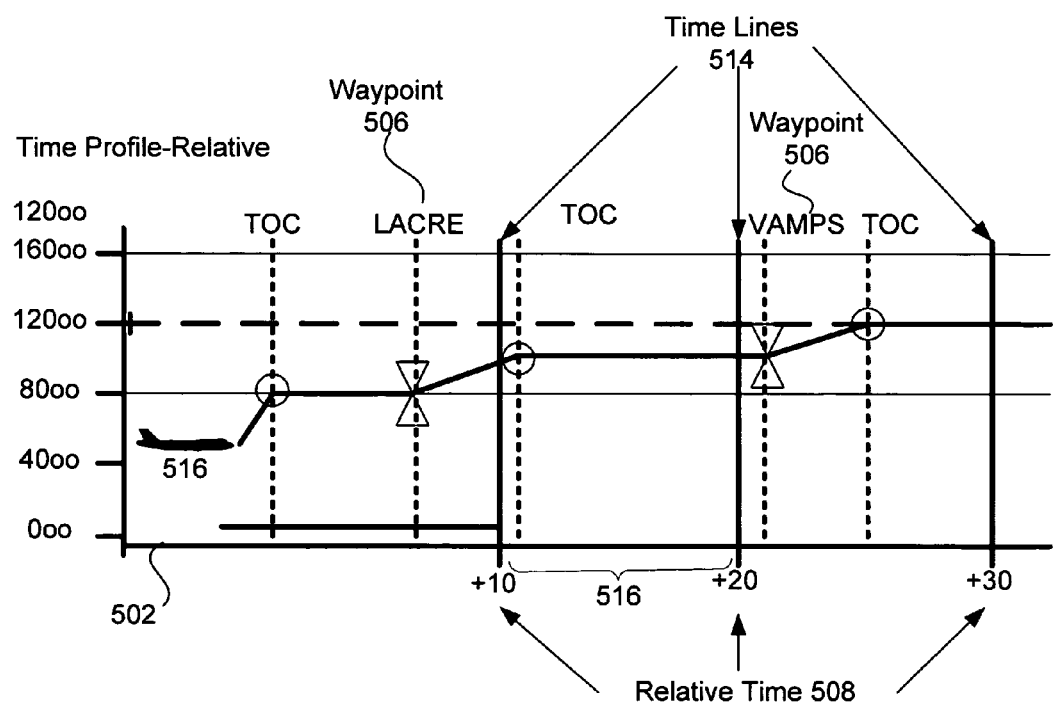
FIG. 5 illustrates a relative time profile 500 which is a second example of vertical profile display of time based navigation information.

FIG. 5 illustrates a relative time profile 500 which is a second example of vertical profile display of time based navigation information (104 of FIG. 1). An alternative example to the absolute representation of time along the X-axis 502 is to use a "relative" scale 508. Here, the time-lines 514 remain fixed at intervals in front of the airplane 516, while the waypoints 506 scroll past. Again, the scale of the X-axis may be modifiable by the pilot with the time increment 516 typically remaining constant while the display may be switched between absolute (400 of FIG. 4) and relative time representations 500.

In much the same way that the previously described absolute time profile (400 of FIG. 4) gives an intuitive picture of the ETA at any waypoint, the relative Vertical profile display of time based navigation information 500 can indicate the estimated time enroute ("ETE") to any waypoint.

In both examples 400 (of FIG. 4), 500 of absolute and relative time profile displays, any change in aircraft performance or environmental conditions can be immediately signaled to the pilot by a time-shift of the waypoints, either towards or away from the airplane. In further alternative examples time windows may also be graphically displayed.

Some flight management systems ("FMS") provide a required time of arrival ("RTA") function, which can be associated with one or more waypoints. This type of function may be necessary to enable 4-D navigation, which typically requires the airplane to pass over a given waypoint at a certain time. With today's navigation systems, a tolerance of 30 seconds is typically allowed at the RTA waypoint.

Figure 6:
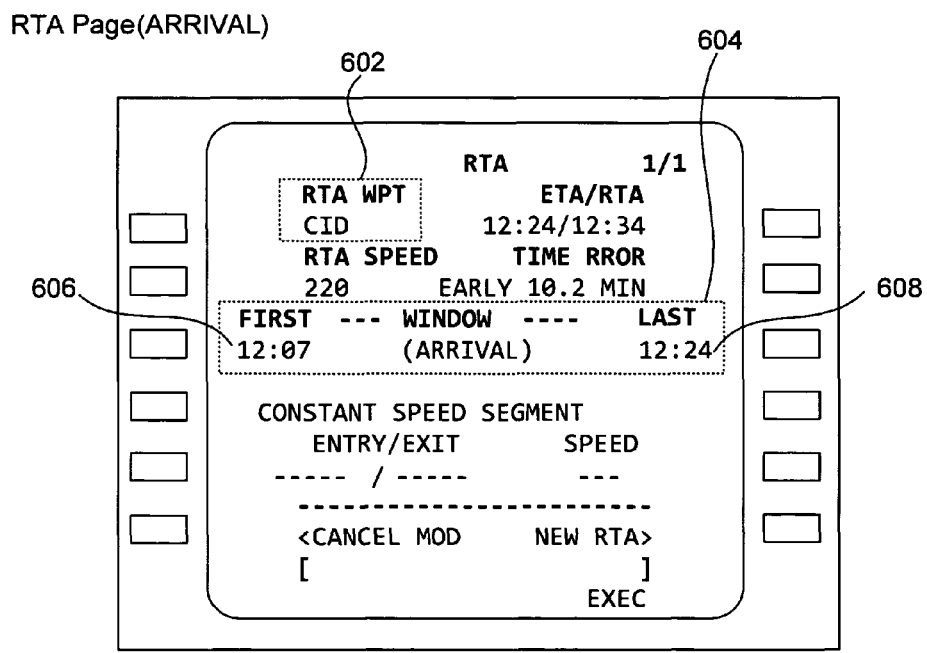
FIG. 6 shows an exemplary flight management system, required time of arrival page display.

FIG. 6 shows an exemplary flight management systems, required time of arrival page display 600. Here, the pilot typically sets up the RTA for a waypoint 602 by selecting a CDU page as shown. When the desired RTA waypoint 602 has been input, the FMS calculates a time window 604, which shows the earliest 606 and latest times 608 that the airplane could arrive at that waypoint based on airplane performance and atmospheric conditions. The time profile user interface 600 is thus, an excellent tool for visualizing not only waypoints with RTA constraints, but also the earliest/latest arrival windows associated with each of those waypoints.

Figure 7:
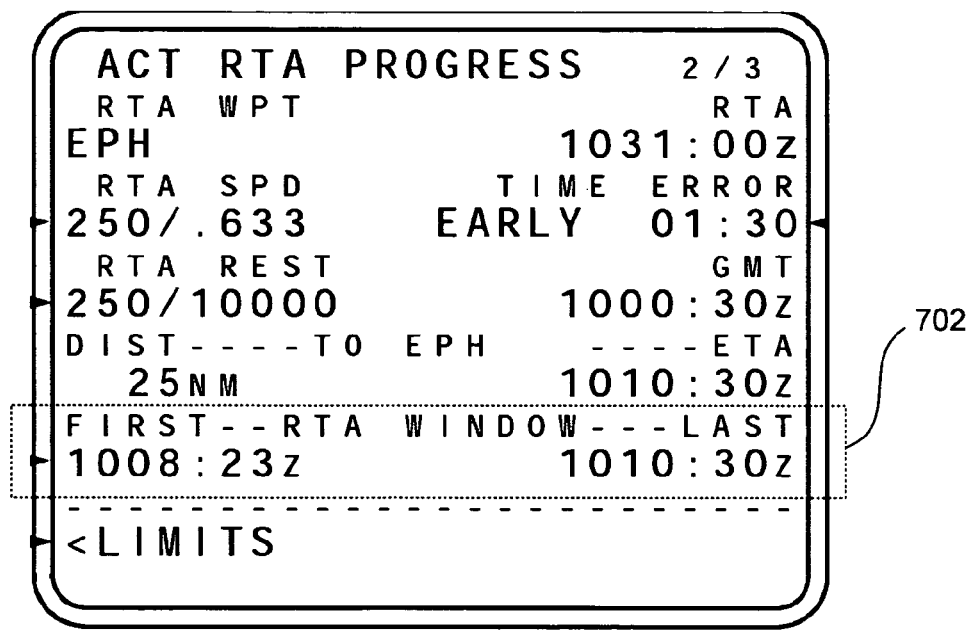
FIG. 7 shows a conventional flight management system, active required time of arrival progress page.

FIG. 7 shows a conventional flight management systems, active required time of arrival progress page 700. Currently, there is no method for graphically displaying the "Time Window" on the navigation map. This is because both times reference the same spatial location. All that can be provided is a textual display 702 of the earliest and latest arrival times.

Figure 8:
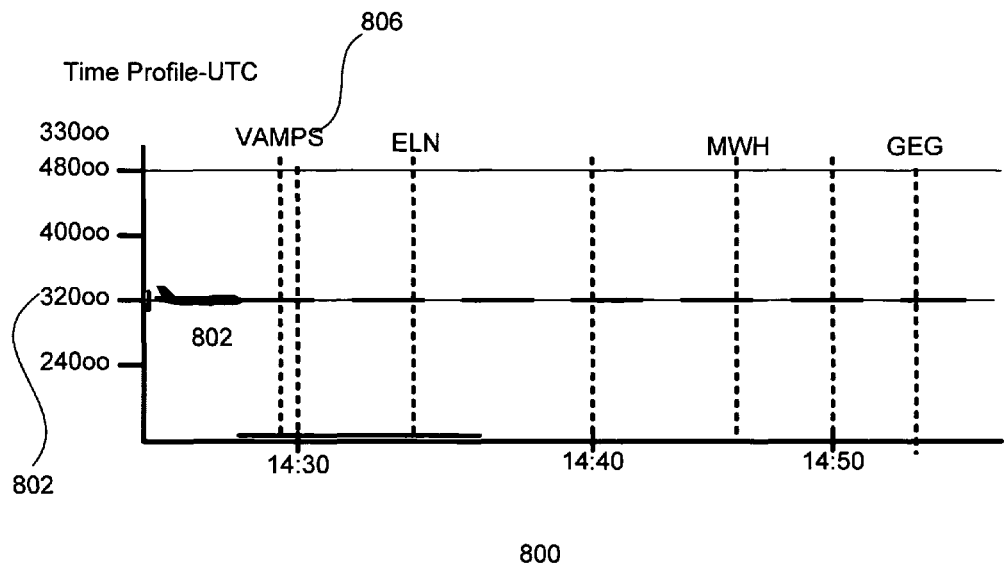
FIG. 8 shows an example of an airplane cruising as shown in a vertical profile display of time based navigation information.

FIG. 8 shows an example of an airplane cruising as shown in a vertical profile display of time based navigation information (104 of FIG. 1). As shown the airplane 802 is in cruise configuration, at an altitude of 33,000 feet 804, directly on course to the waypoint labeled VAMPS 806.

Figure 9:
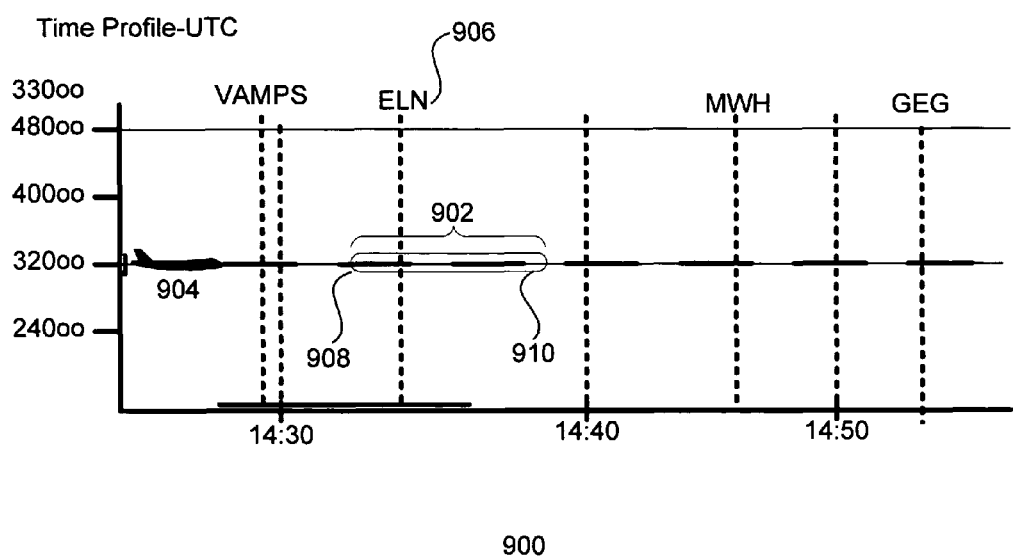
FIG. 9 shows an example of a required time of arrival window shown in a vertical profile display of time based navigation information for a cruising airplane.

FIG. 9 shows an example of a required time of arrival window 902 shown in a vertical profile display of time based navigation information (104 of FIG. 1) for a cruising airplane 904. If the pilot wishes to enter an RTA constraint into the FMS for a waypoint 906 (ELN in this case) the time profile can directly portray the available time window or bar 902. The leading edge of the bar 908 may indicate the earliest possible arrival time, and the trailing edge 910 may indicate the latest arrival time. Both times 908, 910 may be based on actual/predicated airplane performance, environmental conditions and the like. The figure shows the time window to be approximately from 14:33 to 14:39.

Figure 10:
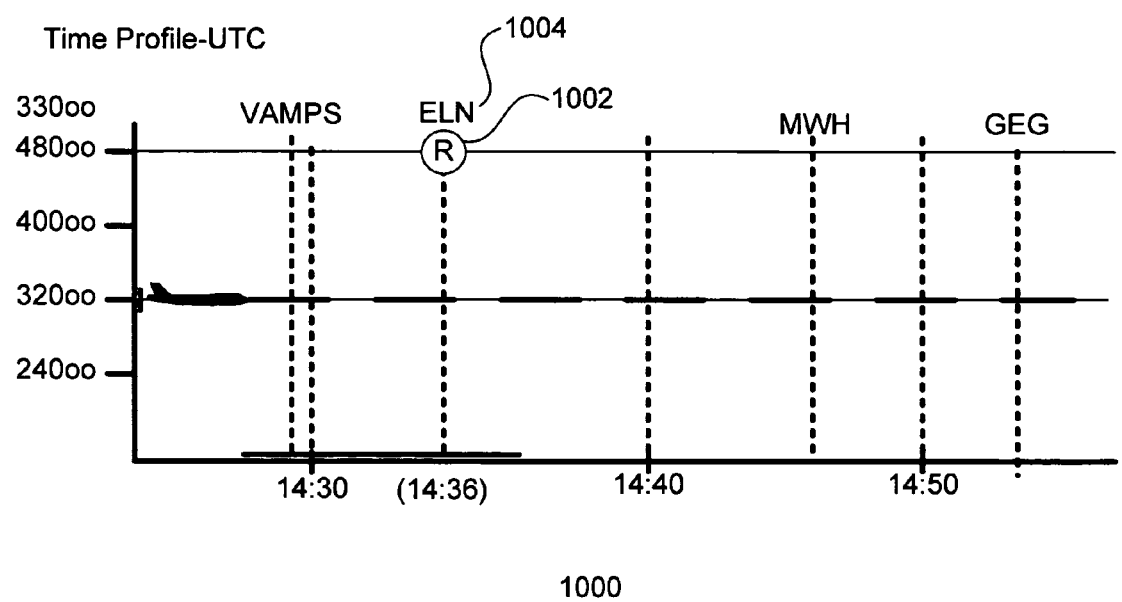
FIG. 10 shows an example of a vertical profile display of time based navigation information further including a required time of arrival constraint for a waypoint.

FIG. 10 shows an example of a vertical profile display 1000 of time based navigation information (104 of FIG. 1) further including a required time of arrival constraint 1002 for a waypoint. The pilot can now select a required time of arrival for waypoint ELN (14:36). A symbol 1002 may be placed beside the waypoint identifier 1004 to indicate that the waypoint 1004 has a time constraint.

Figure 11:
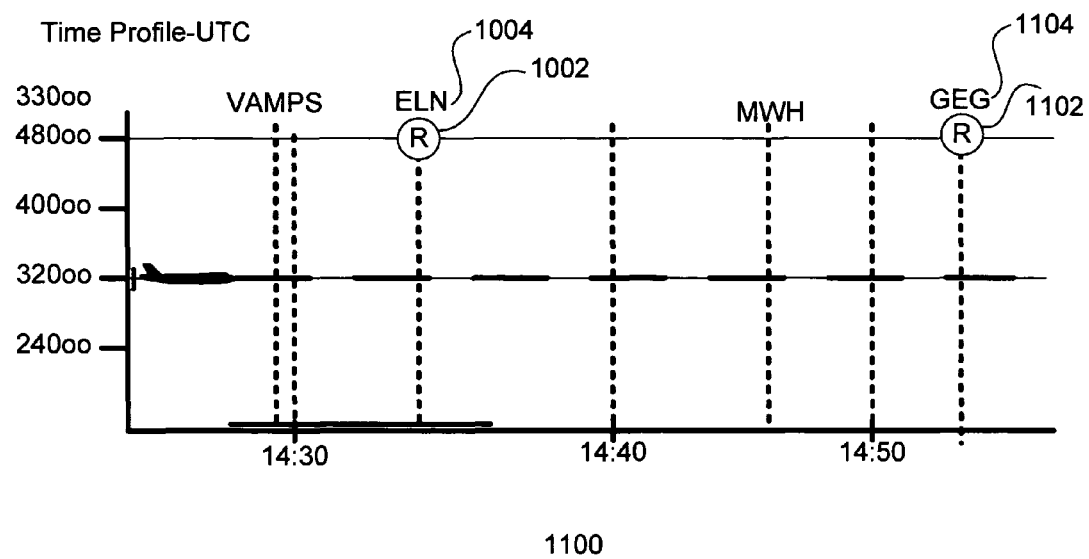
FIG. 11 shows an exemplary display of a vertical profile display of time based navigation information further including multiple required time of arrival constraints.

FIG. 11 shows an exemplary display 1100 of a vertical profile display of time based navigation information (104 of FIG. 1) further including multiple required time of arrival constraints 1002, 1102. For a FMS capable of processing multiple RTA inputs, all the waypoints 1004, 1104 that have an associated RTA, as illustrated may typically be displayed. Thus a plurality of RTA constraints may be displayed.

Figure 12:
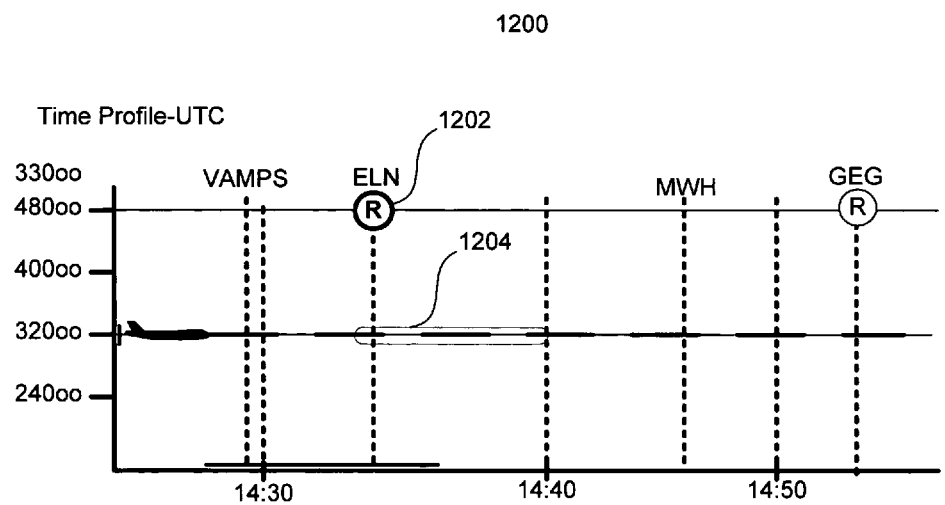
FIG. 12 shows a required time of arrival window monitoring and alerting display to alert a pilot of changing conditions in a vertical profile display of time based navigation information.

FIG. 12 shows a required time of arrival window monitoring and alerting display to alert a pilot of changing conditions in a vertical profile display of time based navigation information 1200. Once one or more RTA constraints are defined, the pilot can select the associated time windows 1204 for viewing at any instant. If the airplane starts to encounter strong headwinds that lead to a reduction in groundspeed, the pilot is able to monitor, in real-time, how the reduction in performance is affecting the available time window 1204. The figure illustrates how such an alert can be signaled to the pilot in the case that a performance deterioration trend is starting to shift the time window such that the airplane may be in danger of not being able to achieve the RTA, even with maximum performance. The above figure uses an exemplary amber outline (caution) around both the RTA symbol 1202 and time window 1204 to indicate that pilot action may be required. In alternative examples alerts may be provided in other ways, such as differing colors, bold or flashing outlines, audio warnings or any combination of those or equivalent methods. In short anything to alert the pilot.

Figure 13:
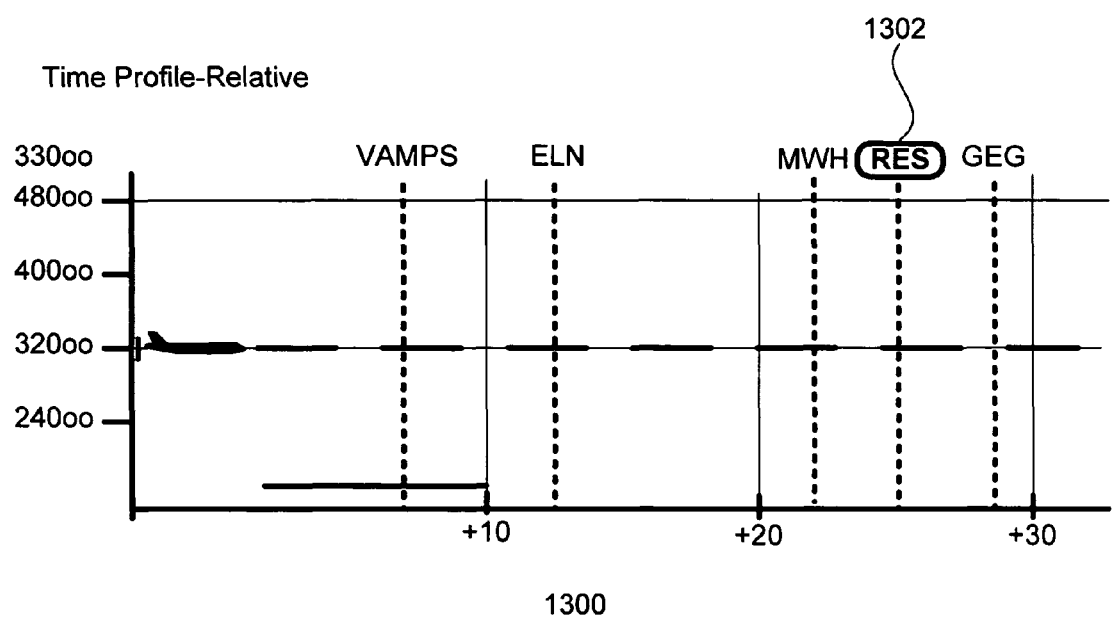
FIG. 13 shows a reserve fuel alert in a vertical profile display of time based navigation information.

FIG. 13 shows a reserve fuel alert in a vertical profile display of time based navigation information 1300. With a time-based map representation, it may also be possible to indicate any time related event, or feature, that occurs within the flight. For example, the display communicates a concept for being able to advise the pilots when reserve fuel will be required 1302.

Alternatively, a warning flag (not shown) can be placed at the point in time where fuel exhaustion will occur. In the case of a fuel leak, the pilot's attention may be drawn to the fact by the appearance, and movement along the time-line at a faster rate than "real-time", of the reserve and exhaustion indications.

In alternative examples reserve fuel alerts may be provided in other ways, such as differing colors, bold or flashing outlines, audio warnings or any combination of those or equivalent methods. In short anything to alert the pilot. In further alternative examples displaying a fuel leak the old reserve may be shown in faint outline with the new lessened reserve shown at normal or bolded intensity to show there has been a reduction in fuel.

When the flight plan contains a holding pattern, the holding pattern can be depicted on the time profile along with any associated time constraints, such as expect further clearance ("EFC") time, or when the allowable fuel for holding will be depleted. The following figures illustrate these concepts for various milestones encountered during a holding pattern.

Figure 14:
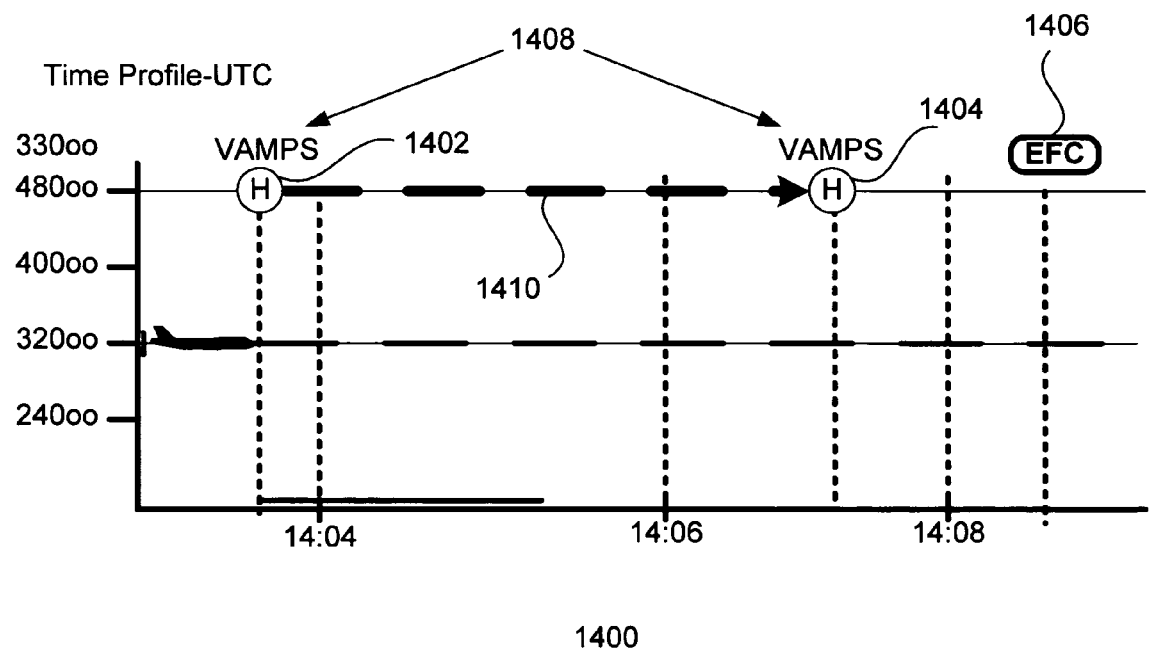
FIG. 14 shows a display of approaching a holding pattern in a vertical profile display of time based navigation information.

FIG. 14 shows a display of approaching a holding pattern in a vertical profile display of time based navigation information 1400. When approaching the hold, the time profile (horizontal axis) indicates the time at which the holding fix will be initially reached 1402, and the time at which the airplane will return to the fix 1404 after the next circuit in the holding pattern. Also shown in the figure is an EFC indicator 1406. Both instances of the waypoint VAMPS 1408 are joined by a thick line (or an equivalent indicator) 1410 between both hold symbols 1402, 1404 to indicate that the airplane will enter a closed-course. Here the first waypoint VAMPS 1402, may be represented by a color or other equivalent indication to communicate that it has not yet been passed.

Figure 15:
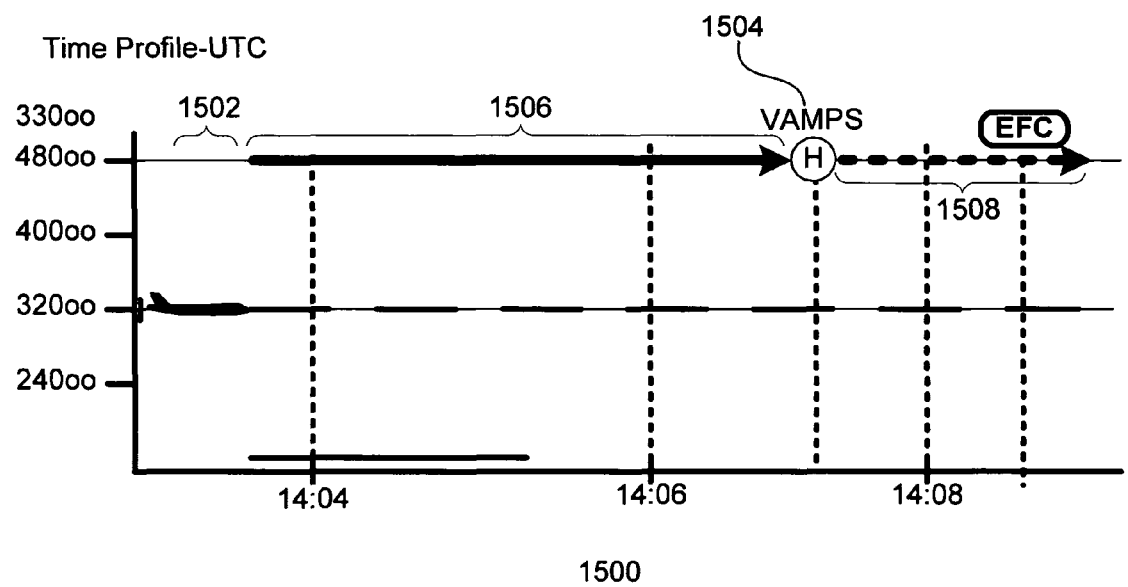
FIG. 15 shows a display of entering a holding pattern in a vertical profile display of time based navigation information.

FIG. 15 shows a display of entering a holding pattern in a vertical profile display of time based navigation information 1500. On crossing the holding fix for the first time, the first instance of VAMPS disappears 1502. The second instance of VAMPS 1504 now becomes the "TO" waypoint and may change color (or provide another equivalent indication), here to an exemplary magenta, along with the closed-course line leading to 1506.

Assuming that an exit from the holding pattern has not been programmed, a second (dashed white line, or an equivalent representation) closed-course line 1508 points to the next instance of VAMPS (not shown) that would be upcoming along the time line.

Figure 16:
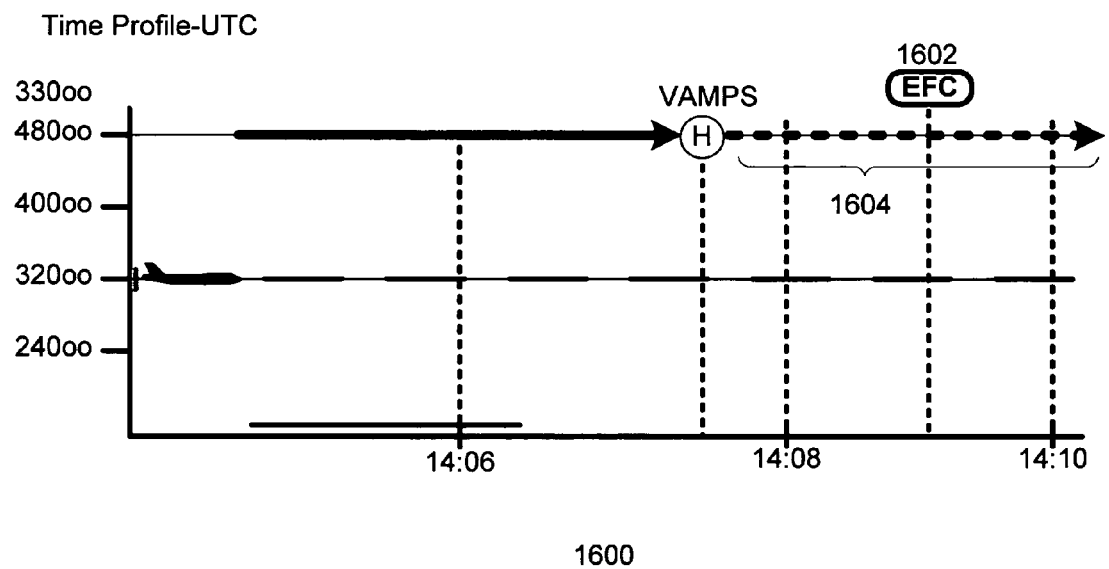
FIGS. 16 and 17 illustrate progressive displays 1600 1700 during the holding pattern of a vertical profile display of time based navigation information.
Figure 17:
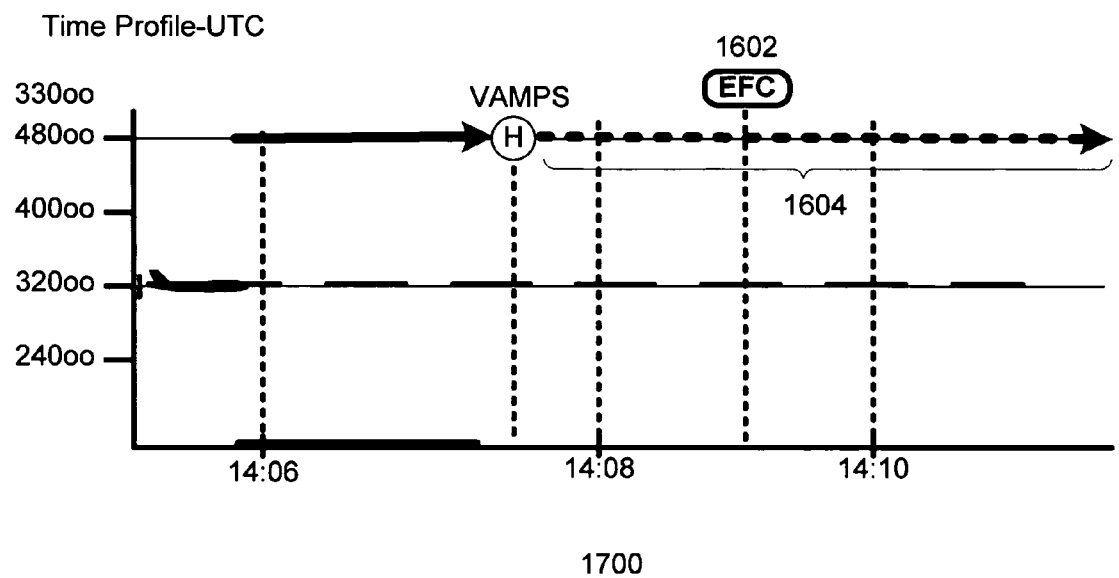

FIGS. 16 and 17 illustrate progressive displays 1600 1700 during the holding pattern of a vertical profile display of time based navigation information. Note that the airplane will arrive at the EFC 1602 time before completion of the subsequent circuit 1604. This process continues until either an exit from the holding pattern is programmed into the FMS, or a Direct-To operation is carried out. In the case of an exit, the following segments of the flight plan will be appended to the holding fix. In the case of a Direct-To, the holding fix will be replaced by the new "TO" waypoint and subsequent flight plan legs.

Figure 18:
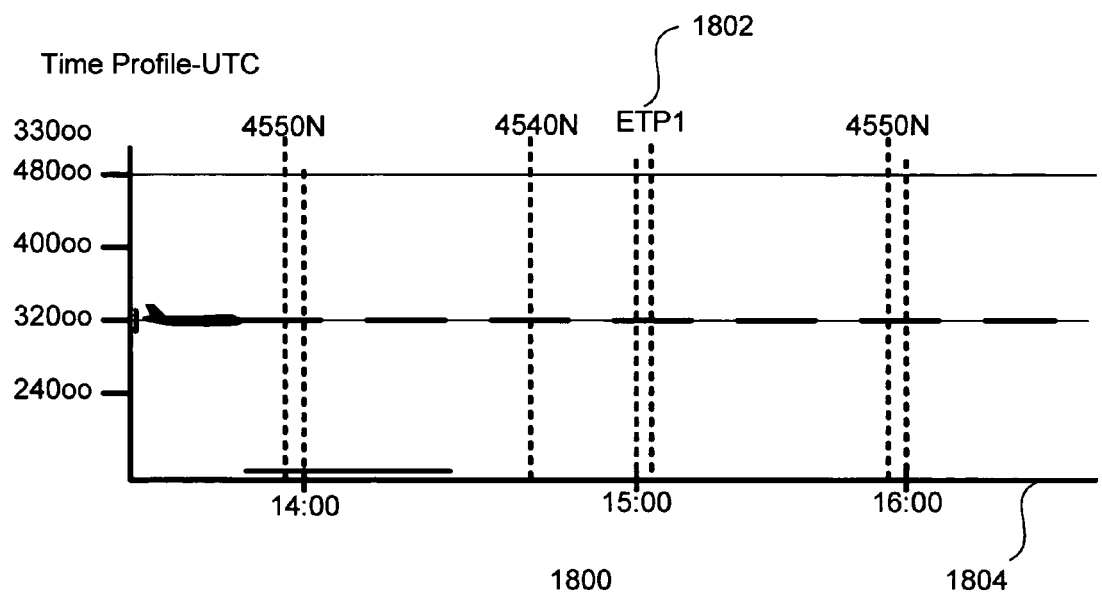
FIG. 18 shows a display of equal time points, or points of no return in a vertical profile display of time based navigation information.

FIG. 18 shows a display of equal time points, or points of no return in a vertical profile display of time based navigation information. For oceanic flight, the time profile can display equal time points ("ETP") or alternatively points-of-no-return ("PNR"), or the like 1802 as events along the time-line 1804. Thus a pilot can easily see how much time remains until a point of no return is reached as shown in this example. In the further alternative examples below time between the aircraft and nearby air traffic targets may easily be seen in terms of time.

The time profile of a vertical profile display of time based navigation information can provide pertinent and intuitive indications for traffic alert collision avoidance system ("TCAS") traffic targets. Rather than indicating a distance to a traffic target or a potential traffic conflict, the vertical profile display of time based navigation information can directly indicate the time interval between the aircraft and a target. The time interval equates to the time it would take for the aircraft to reach the position currently occupied by the target. This is the method that air traffic control ("ATC") use when separating traffic by time interval, although with ATC radar typically being a spatial display, this interval can typically only be approximated. The "now" position of the TCAS target is updated in real-time as the target moves.

In alternative examples having target intent, or trajectory information being broadcast over automatic dependent surveillance-broadcast ("ADS-B"), a potential conflict in time may also be displayed.

Only traffic which is either within a limited swath ahead of the aircraft, or on a conflicting trajectory is depicted on the vertical profile display of time based navigation information.

Figure 19:
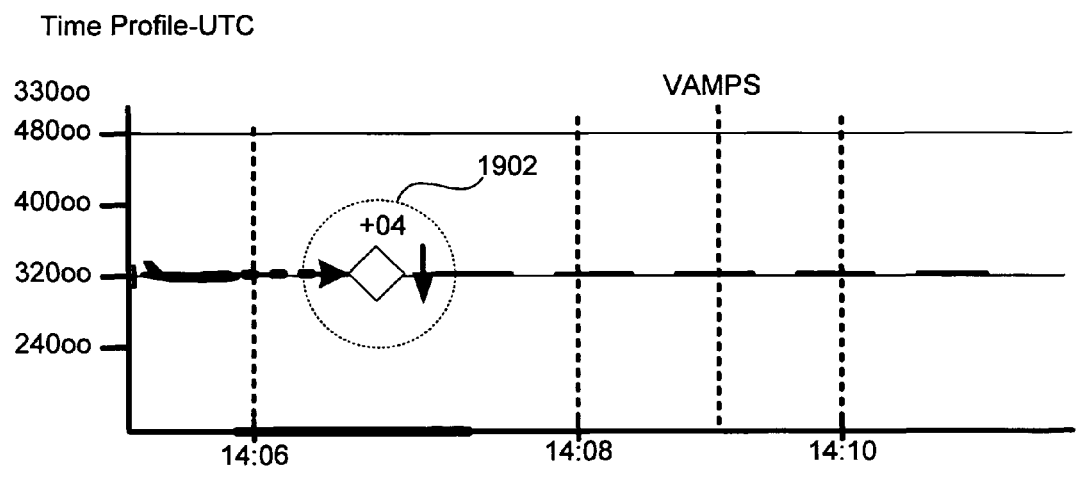
FIG. 19 shows a display showing proximate traffic in a vertical profile display of time based navigation information.

FIG. 19 shows a display showing proximate traffic in a vertical profile display of time based navigation information 1900. Proximate traffic typically less than a preset or adjustable threshold (here less than six nautical miles from the aircraft) is shown 1902. The indication may be provided utilizing any convenient sign, sound, symbol, letters, color, or the like. Alternatively combinations of indicators may also be provided.

Figure 20:
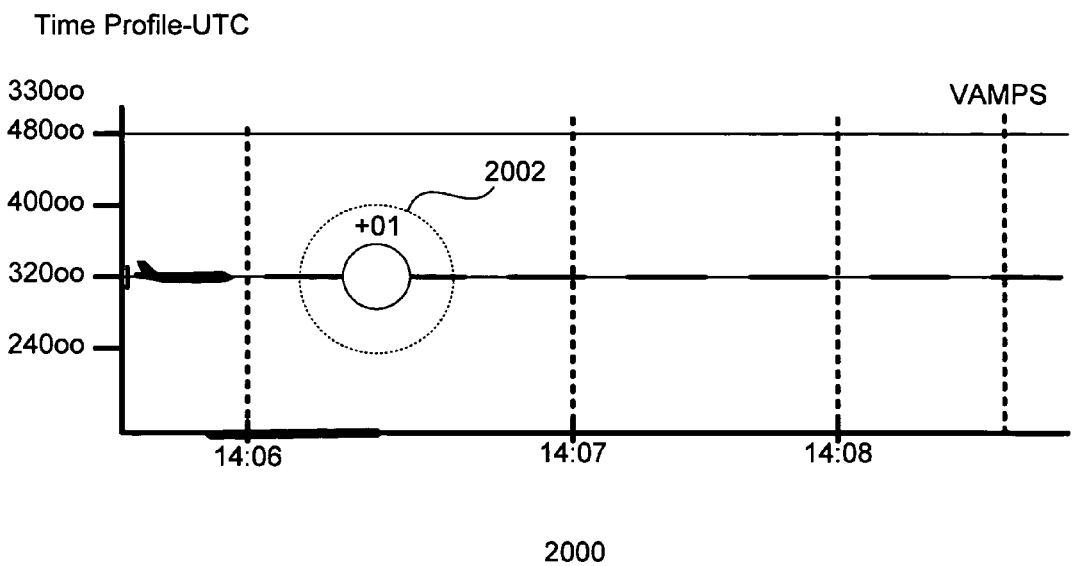
FIG. 20 shows a display of a traffic advisory in a vertical profile display of time based navigation information.

FIG. 20 shows a display of a traffic advisory in a vertical profile display of time based navigation information 2000. As the near-by air traffic moves closer in time, and becomes a potential conflict, the target may change from a proximate traffic display to a traffic advisory 2002.

In much the same way as the current navigation map reconfigures to a ten nautical mile range whenever there is a traffic advisory or traffic alert, the time profile can reconfigure to the suitable minimum time interval (in this example, 1 minute) to provide the pilot with increased time resolution. any suitable indication may be provided. The indication may be provided utilizing any convenient sign, sound, symbol, letters, color, or the like. Alternatively combinations of indicators may also be provided. Alternatively, bolding of text, change of color from amber to red, increase in sound pitch or the like may be used to indicate a change of status to that of a more pressing mature may be provided.

In a final example the vertical profile display of time based navigation information may also be suitable for displaying ADS-B traffic targets that are within a limited swath ahead of the airplane. The vertical profile display of time based navigation information may also provide an intuitive interface for aircraft surveillance applications ("ASA") which may be part of the cockpit display of traffic information ("CDTI"). In particular, airplane-spacing applications, which aim to delegate the task of separation and spacing from ATC to the flight crew. For example, an airplane may be required to follow another airplane at a particular time spacing (e.g. 60 seconds). Such self-spacing has the potential to increase traffic flow to the runway.

Figure 21:
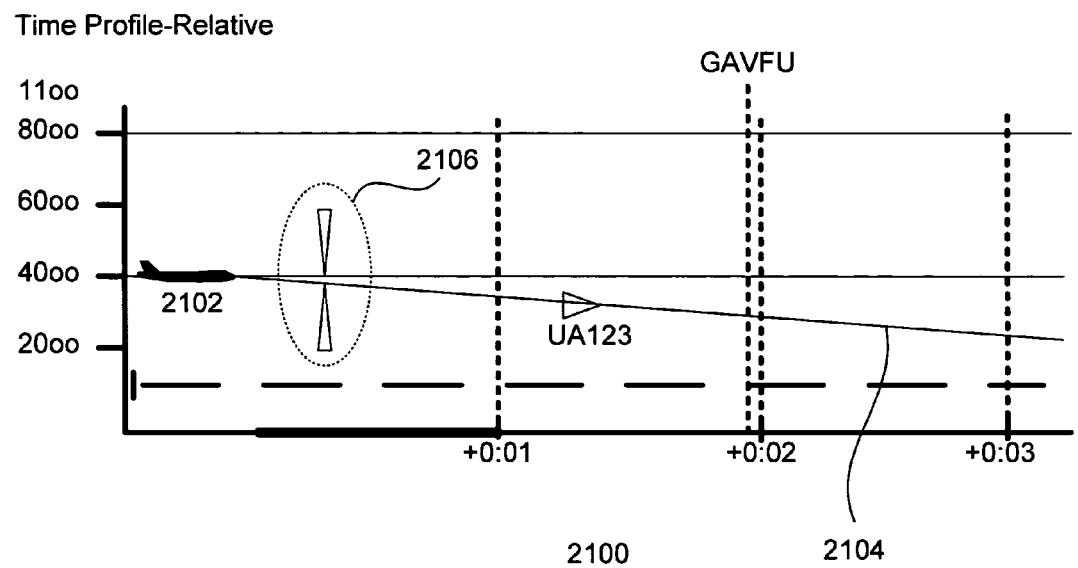
FIG. 21 shows a self-spacing display in a vertical profile display of time based navigation information.

FIG. 21 shows a self-spacing display in a vertical profile display of time based navigation information 2100. In this example, the aircraft 2102 is to follow flight UA123 at an exemplary spacing of 60 seconds down the approach path 2104 to the airport. A "gate" 2106 can be depicted slightly ahead of the aircraft 2102 position to indicate that the aircraft 2102 should be slightly ahead in time to be at the correct spacing. In this case, the pilot would increase the airplane's speed until the aircraft lines up with the gate. The placement of UA123 on the vertical profile display of time based navigation information indicates the time it would take for aircraft to reach the current position of UA123.

Figure 22:
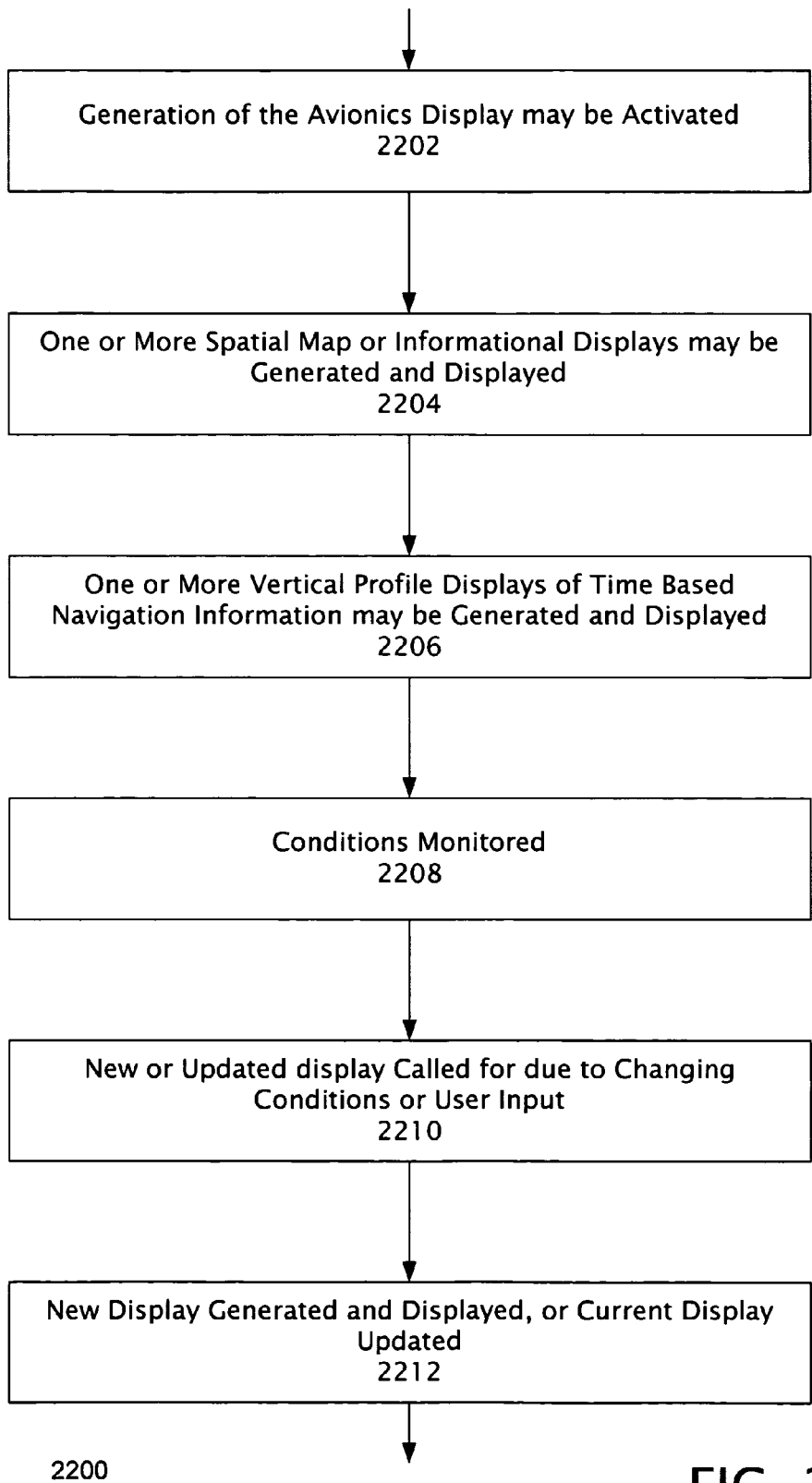
FIG. 22 shows a process (208 of FIG. 2) for generating the exemplary vertical profile display of time based navigation information.

FIG. 22 shows a process (208 of FIG. 2) for generating the exemplary vertical profile display of time based navigation information 400, 500, 600, 800, 900, 1000, 1100, 1200, 1300, 1400, 1500, 1600, 1700, 1800, 1900, 2000, 2100. First generation of the avionics display (108 of FIG. 2) is activated 2202. Next one or more spatial map or informational displays may be generated and displayed 2204. And at block 2206 one or more vertical profile displays of time based navigation information (104 of FIG. 2) may be generated and displayed. Conditions may be monitored at block 2208. And, if a new or updated display may be called for due to changing conditions or user input 2210, the new display may be generated and displayed, or the current display may be updated 2212.

Figure 23:
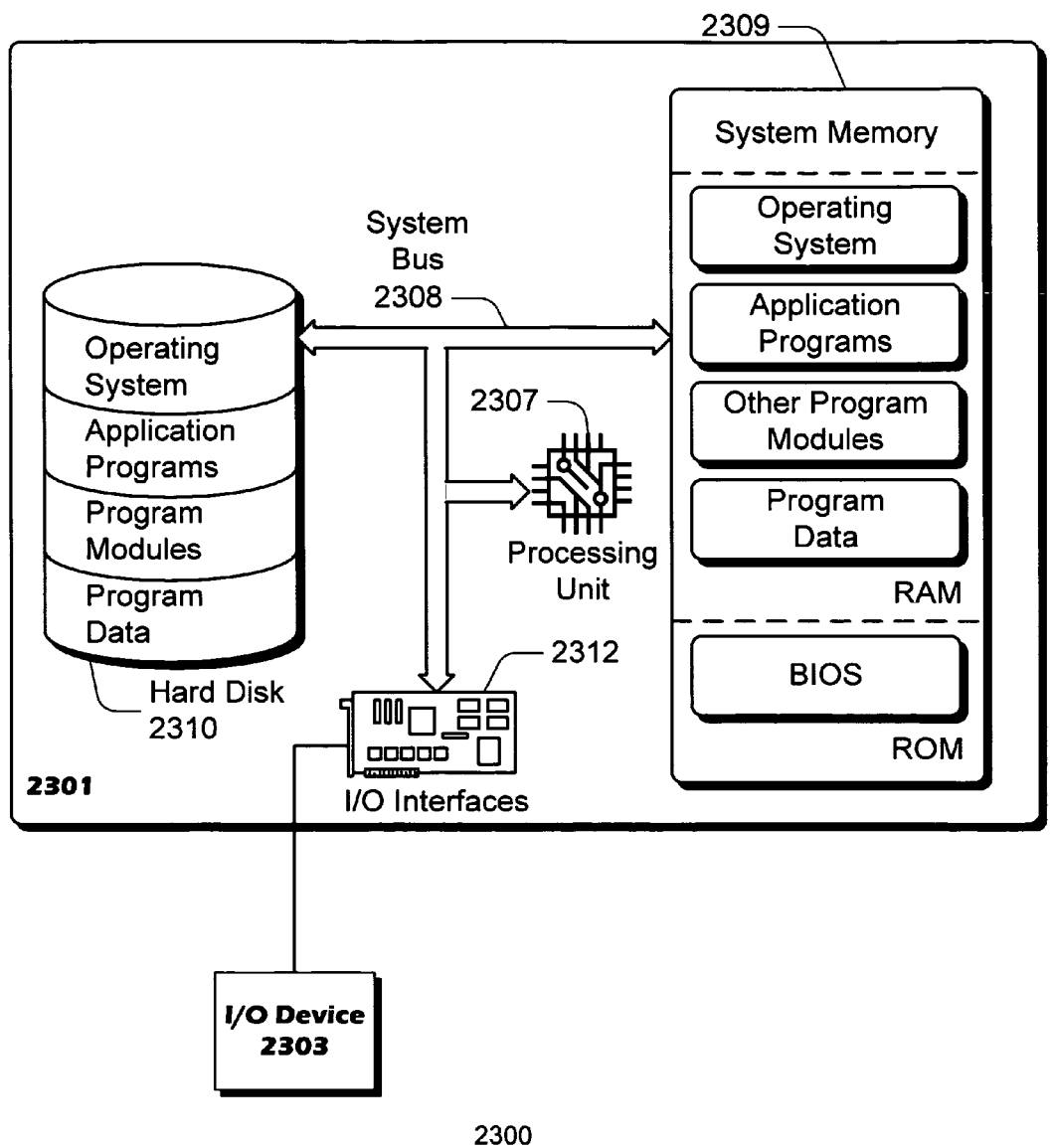
FIG. 23 illustrates an exemplary computing environment in which the vertical profile display of time based navigation information.

FIG. 23 illustrates an exemplary computing environment 2300 in which the vertical profile display of time based navigation information 400, 500, 600, 800, 900, 1000, 1100, 1200, 1300, 1400, 1500, 1600, 1700, 1800, 1900, 2000, 2100 described in this application, may be implemented. Exemplary computing environment 2300 is only one example of a computing system and is not intended to limit the examples described in this application to this particular computing environment.

For example the computing environment 2300 can be implemented with numerous other general purpose or special purpose computing system configurations. For example, the computing system may be included in an avionics "black box" (201 of FIG. 2) containing other avionics components or standing alone. However, the functionality, or processes provided by the examples described may be installed as one or more application programs within a modern integrated modular architecture (i.e. a cabinet) avionics platform. Examples of well known computing systems, may include, microprocessor-based systems, multiprocessor systems, redundant computing systems with cross strapping, and the like.

The computer, or flight management computer, 2300 includes a general-purpose computing system in the form of a computing device 2301. The components of computing device 2301 can include one or more processors (including CPUs, GPUs, microprocessors and the like) 2307, a system memory 2309, and a system bus 2308 that couples the various system components such as an I/O interface 2303 coupled to the system bus 2308 via an I/O interface 2312. Processor 2307 processes various computer executable instructions, including those to implement vertical profile display of time based navigation information 400, 500, 600, 800, 900, 1000, 1100, 1200, 1300, 1400, 1500, 1600, 1700, 1800, 1900, 2000, 2100, to control the operation of computing device 2301 and to communicate with other electronic and computing devices (not shown). The system bus 2308 represents any number of several types of bus structures, including a memory bus or memory controller, a peripheral bus, an accelerated graphics port, and a processor or local bus using any of a variety of bus architectures.

The system memory 2309 includes computer-readable media in the form of volatile memory, such as random access memory (RAM), and/or non-volatile memory, such as read only memory (ROM). A basic input/output system (BIOS) is stored in ROM. RAM typically contains data and/or program modules that are immediately accessible to and/or presently operated on by one or more of the processors 2307. Input devices are connected to the processor 2307 via input/output interfaces 2312 that are coupled to the system bus 2308.

Those skilled in the art will realize that the process sequences described above may be equivalently performed in any order to achieve a desired result. Also, sub-processes may typically be omitted as desired without taking away from the overall functionality of the processes described above.

Those skilled in the art will realize that storage devices utilized to store program instructions can be distributed across a network. For example a primary computer may store an example of the process described as software. A back up or cross strapped computer may access the remote computer and download a part or all of the software to run the program. Alternatively the back up computer may download pieces of the software as needed, or distributively process by executing some software instructions at the local terminal and some at the remote computer (or computer network).

The invention claimed is:

1. A method employed in a computer system of an aircraft for displaying time based navigation information, such method comprising:
    displaying a horizontal axis indicative of a time based scale, where such time based scale is marked off with a plurality of equally-spaced vertical time lines extending upwardly from the horizontal axis, and
        a numerical indication of time is depicted below each vertical time line;
    displaying a vertical axis indicative of a vertical height based scale, where such vertical axis extends upwardly from the horizontal axis; and
    displaying the horizontal axis and the vertical axis together with a vertical profile display of time based navigation information in response to selection of an input.

2. The method of claim 1, wherein the vertical profile display of time based navigation information displays an absolute time profile.

3. The method of claim 1, wherein the vertical profile display of time based navigation information displays a relative time profile.

4. The method of claim 1, wherein the vertical profile display of time based navigation information is required time of arrival page display.

5. The method of claim 1, wherein the vertical profile display of time based navigation information is aircraft cruising information.

6. The method of claim 1, wherein the vertical profile display of time based navigation information provides required time of arrival information.

7. The method of claim 1, wherein the vertical profile display of time based navigation information displays a required time of arrival constraint for a waypoint.

8. The method of claim 1, wherein the vertical profile display of time based navigation information includes a plurality of required time of arrival constraints.

9. The method of claim 1, wherein the vertical profile display of time based navigation information includes a required time of arrival window monitoring and alerting display.

10. The method of claim 1, wherein the vertical profile display of time based navigation information includes a time based event.

11. The method of claim 1, wherein the vertical profile display of time based navigation information includes a display of approaching a holding pattern.

12. The method of claim 1, wherein the vertical profile display of time based navigation information includes a display of entering a holding pattern.

13. The method of claim 1, wherein the vertical profile display of time based navigation information includes a display of equal time points.

14. The method of claim 1, wherein the vertical profile display of time based navigation information includes proximate traffic indications.

15. The method of claim 1, wherein the vertical profile display of time based navigation information includes traffic advisory indications.

16. The method of claim 1, wherein the vertical profile display of time based navigation information includes self-spacing indicators.

17. A system for generating a vertical profile display of time based navigation information, such system comprising:
   controlling avionics to process at least one input and generate a display signal; and
   an avionics display coupled to the controlling avionics to receive the display signal and to generate a horizontal axis and a vertical axis together with a vertical profile display of time based navigation information, where
      the horizontal axis is indicative of a time based scale, where
         such time based scale is marked off with a plurality of equally-spaced vertical time lines extending upwardly from the horizontal axis, and
         a numerical indication of time is depicted below each vertical time line, and
      the vertical axis is indicative of a vertical height based scale, where such vertical axis extends upwardly from the horizontal axis.

18. The system of claim 17, wherein spatial navigation map information is displayed on the avionics display.

19. The system of claim 17, wherein the avionics display is an LCD display.

20. A system comprising:
   a processing means for processing at least one input and generating a display signal; and
   a display means for generating and viewing a horizontal axis and a vertical axis together with vertical profile display of time based navigation information of the display signal generated by the processing means, where
      the horizontal axis is indicative of a time based scale, where
         such time based scale is marked off with a plurality of equally-spaced vertical time lines extending upwardly from the horizontal axis, and
         a numerical indication of time is depicted below each vertical time line, and
      the vertical axis is indicative of a vertical height based scale, where such vertical axis extends upwardly from the horizontal axis.

\* \* \* \* \*